United States Patent
Hooda et al.

(10) Patent No.: US 10,298,717 B2
(45) Date of Patent: May 21, 2019

(54) CONTEXT EXPORT FROM AN ACCESS POINT TO A FABRIC INFRASTRUCTURE

(71) Applicant: CISCO TECHNOLOGY, INC., San Jose, CA (US)

(72) Inventors: Sanjay Kumar Hooda, Pleasanton, CA (US); Sarath Gorthi Subrahmanya, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 148 days.

(21) Appl. No.: 15/368,633

(22) Filed: Dec. 4, 2016

(65) Prior Publication Data

US 2018/0159957 A1    Jun. 7, 2018

(51) Int. Cl.
  *H04L 12/46*    (2006.01)
  *H04L 29/08*    (2006.01)
  *H04L 12/715*   (2013.01)

(52) U.S. Cl.
  CPC ........ *H04L 67/327* (2013.01); *H04L 12/4633* (2013.01); *H04L 45/64* (2013.01)

(58) Field of Classification Search
  CPC ....... H04L 29/08; H04L 12/46; H04L 12/715; H04L 67/327; H04L 12/4633; H04L 45/64
  See application file for complete search history.

(56) References Cited

U.S. PATENT DOCUMENTS

| | | | |
|---|---|---|---|
| 2009/0328186 A1* | 12/2009 | Pollutro | G06F 21/31 726/13 |
| 2012/0020260 A1* | 1/2012 | Chen | H04W 28/08 370/310 |
| 2015/0009995 A1* | 1/2015 | Gross, IV | H04L 45/74 370/392 |

* cited by examiner

*Primary Examiner* — Charles C Jiang
*Assistant Examiner* — Kyaw Z Soe
(74) *Attorney, Agent, or Firm* — Edell, Shapiro & Finnan, LLC

(57) ABSTRACT

Aspects of the embodiments are directed to a network element that is configured for receiving, from an access point, a data packet originating from a client, the data packet comprising a packet header that comprises a packet header augmented with context information; decapsulating the packet header to identify the context information; applying a client-specific policy on the packet based, at least in part, on the context information; and forwarding the packet to a next hop in the network. The network element can be part of a network, such as a datacenter fabric architecture.

21 Claims, 6 Drawing Sheets

CONTEXT EXPORT FROM AN ACCESS POINT TO A FABRIC INFRASTRUCTURE

FIELD

This disclosure pertains to context export from an access point to a fabric infrastructure, and, more particularly, to context export from an access point to a fabric infrastructure for visibility and roaming.

BACKGROUND

Data centers are increasingly used by enterprises for effective collaboration and interaction and to store data and resources. A typical data center network contains myriad network elements, including hosts, load balancers, routers, switches, etc. The network connecting the network elements provides secure user access to data center services and an infrastructure for deployment, interconnection, and aggregation of shared resources as required, including applications, hosts, appliances, and storage. Improving operational efficiency and optimizing utilization of resources in such data centers are some of the challenges facing data center managers. Data center managers want a resilient infrastructure that consistently supports diverse applications and services and protects the applications and services against disruptions.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts.

DETAILED DESCRIPTION

Figure 1A:
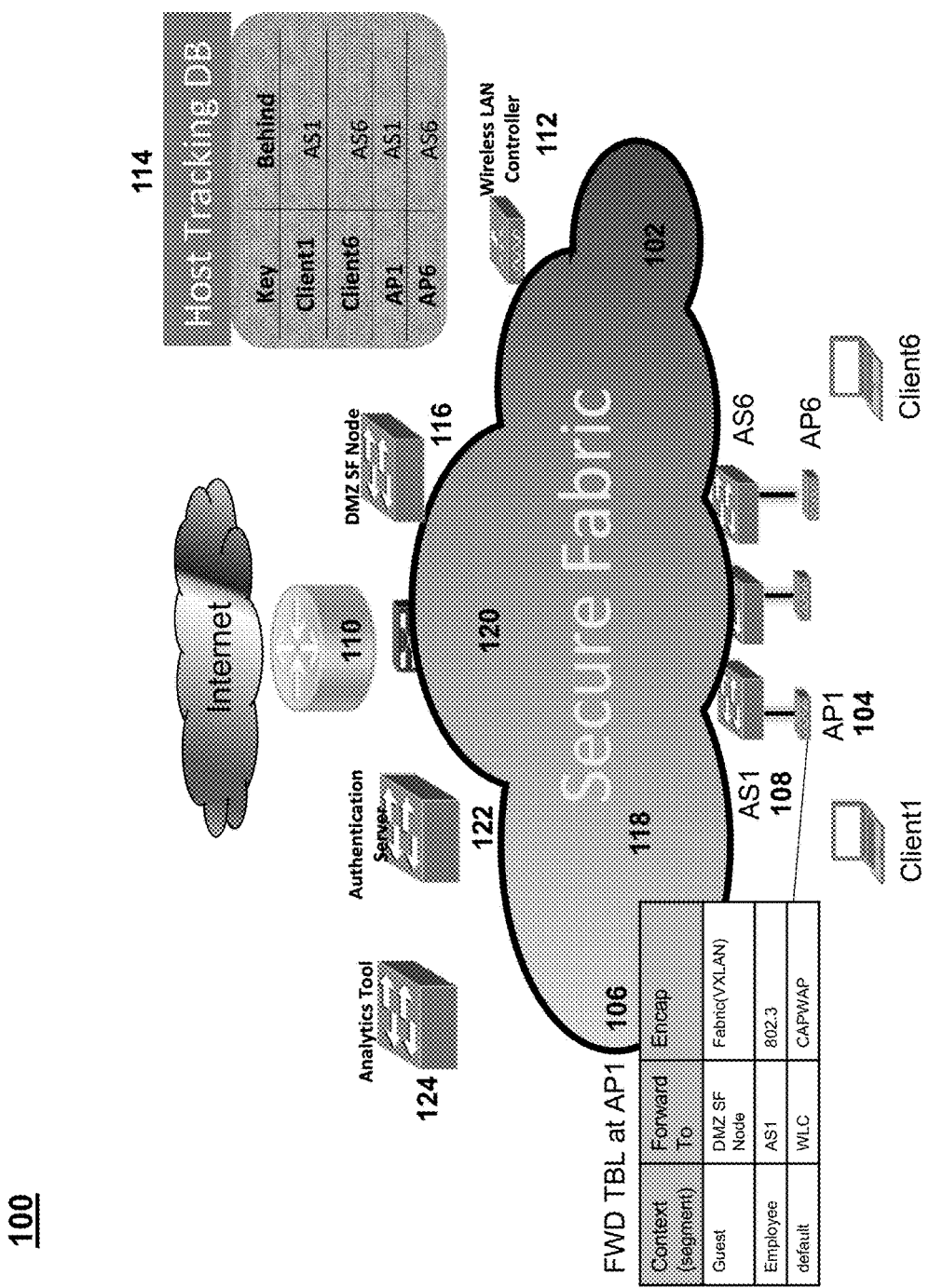
FIG. 1A is a schematic diagram of a network that includes an access point and an autonomous system in accordance with embodiments of the present disclosure.

Aspects of the embodiments are directed to a method performed by an autonomous system of a network. The method can include receiving, from an access point, a data packet originating from a client, the data packet comprising a packet header that comprises a packet header augmented with context information; decapsulating the packet header to identify the context information; applying a client-specific policy on the packet based, at least in part, on the context information; and forwarding the packet to a next hop in the network.

Aspects of the embodiments are directed to an autonomous system network element connected to a network, the autonomous system network element can include at least one memory element having instructions stored thereon. The autonomous system network element can include at least one processors coupled to the at least one memory element and configured to execute the instructions to cause the network element to receive, from an access point, a data packet originating from a client, the data packet comprising a packet header that comprises a packet header augmented with context information; decapsulate the packet header to identify the context information; apply a client-specific policy on the packet based, at least in part, on the context information; and forwarding the packet to a next hop in the network.

Aspects of the embodiments are directed to a computer-readable non-transitory medium comprising one or more instructions for processing context information in a data packet, the instructions when executed on a processor are operable to receive, from an access point, a data packet originating from a client, the data packet comprising a packet header that comprises a packet header augmented with context information; decapsulate the packet header to identify the context information; apply a client-specific policy on the packet based, at least in part, on the context information; and forward the packet to a next hop in the network.

In some embodiments, the context information comprises one or more of session information, group identification information, client identification information, encapsulation information, virtual network identification information, or service set identification information.

Some embodiments can also include exporting the context information to an analytics tool network element.

In some embodiments, exporting the context information comprises exporting the context information as part of a Netflow export process.

Some embodiments can also include obtaining the client-specific policy information from a controller network element based on the context information; and applying the client-specific policy information using the one or more client-specific policies obtained from the controller network element.

Some embodiments can also include identifying the next-hop destination for the packet from the context information; and forwarding the packet to the next hop in the network based on the context information.

Some embodiments can also include obtaining next hop information from a controller network element; and verifying the next hop information based on the context information.

In Enterprise Fabric Environments, the wireless data-packets go directly from an access point (AP) to the fabric. The session information on the switching infrastructure is not available. This disclosure describes exporting the context information, e.g., session, etc., as part of the data-path. This exporting of context information can helps in Netflow export from the switch with additional session information. The exporting can help with the application of policies at the switch, can help the switch download the right policy from the controller {ISE, APIC-EM etc} based on the context received.

Additionally, exporting of context information can help with roaming, when a client moves to a new switch. As an XID packet is sent towards the switch fabric, the header can include the context so that the switch fabric can download the policy. This saves time on roam for policy application.

FIG. 1A is a schematic diagram of a network system 100 that includes an access point 104 and an autonomous system 108 in accordance with embodiments of the present disclosure. Network system 100 includes a secure fabric 102 that can be a fabric overlay over a physical switch underlay, as described below. The secure fabric 102 can create virtual connections between physical switches to route packets through the fabric to one or more physical routers, such as router 110. The network system 100 also includes a controller 112 that can be a wireless controller. Controller 112 can serve as a network element that provides control plane functionality, that includes a host tracking database 114.

The network system 100 can include an access point (AP1) 104 that an connect a client (Client1) 130 to the network system 100. Client1 130 can join the network by attaching to AP1 104. Upon client attachment to AP1 104, the authentication server 122 can authenticate client1 130 identity using client-specific information provided by the client1 130. A wireless LAN controller 112 can provide the AP1 104 context information, such as group information, for the client1 130.

In general terms, AP1 104 can be a radio access point device that can allow a client to connect to a (wired) network using WiFi, Bluetooth™, WiMAX, or any other connection protocol. Hence, the term access point can be inclusive of a hotspot, a WiFi array, a wireless bridge (e.g., between networks sharing same Service Set Identifier (SSID) and radio channel) or any other suitable access device, which may be capable of providing suitable connectivity to a client. In certain cases, the access point can connect to a router (e.g., via a network, including a virtual network), which can relay data between the client and other connection points in the network.

The AP1 104 can encapsulate an incoming packet from client1 130 with context information from a forwarding table 106. Forwarding table 106 can include context information for client1 130 received from the control plane wireless controller 116. Context information can include group information, client identification information, session information, such as service set identifier (SSID), or other context information for the client1 130. The AP1 104 can augment the packet header, such as a network service header (NSH), with the context information prior to transmitting the packet to the autonomous system 108 across a fabric tunnel (such as a VXLAN or VXLAN-GPE). Autonomous system 108 can be a first-hop switch that is part of the fabric edge of the fabric 102.

The forwarding table 106 can identify a context for client1 130 and for each context, can identify a next-hop destination, and a virtual network identifier. The virtual network identifier information can inform the AP1 104 how to encapsulate the packet from client1 130 for transmission through the fabric overlay 102.

The AP1 104 can transmit the encapsulated packet to an autonomous system (AS1) 108. AS1 108 can be a next-hop switch or boundary router in the fabric 102. The AS1 108 can decapsulate the encapsulated packet received from the AP1 104. Based on the context information contained in the packet, the AS1 can route the packet through the corresponding encapsulation protocols to an appropriate destination (which can also be identified in the packet header).

The AS1 108 can implement policies specific to the client using the context information encapsulated in the packet header. For example, a client representing an employee of a company using the virtual network infrastructure can be permitted to access employee-specific portions of a datacenter, specific applications available to the employee, or other policy-enforced accesses, such as the outside Internet. Similarly, the AS can use context information to download the correct policies and routing information from the controller 116.

Information from the context contained in the encapsulated packet can be used for analytics. For example, context information can be provided by the AS1 108 to an analytics tool 124. For example, as client 130 moves, client 130 can attached to a different access point. The identity of the access point that the client 130 is attached to can be included in the encapsulated packet header. The analytics tool 124 can use the access point identifier to determine a location of the client 130 as the client moves between access points. In some embodiments, specific context information about the client 130 can also be provided by the AS1 108 to the analytics tool 124.

In embodiments, analytic information can be exported from the AS1 108 via Netflow. In addition to other information for Netflow export, the context information encapsulated in the packet header by the access point can also be exported from the AS to the analytics tool 124. During the Netflow export, these analytics data can be exported using hardware accelerators via Netflow for analytics and other consumption from the switch fabric infrastructure.

Another example use case is to use the NSH header meta data to aid in roaming. In case of Wifi roaming AP/WLC can embed the tag as part of XID frames NSH header during re-association, which can help the switches in downloading the associated tag early before the traffic is seen from the client. This will help create a seamless roaming experience for the client.

Figure 2:
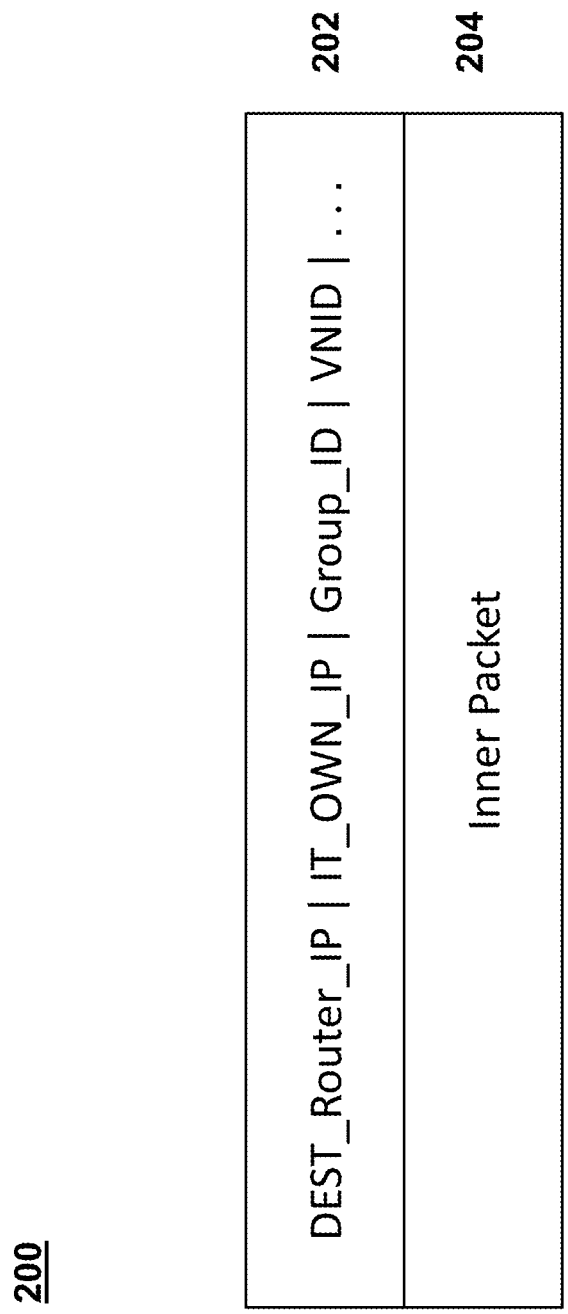
FIG. 2 is a schematic diagram of a network service header of a packet in accordance with embodiments of the present disclosure.

FIG. 2 is a schematic diagram of a header 202 of a packet 200 in accordance with embodiments of the present disclosure. The AP1 104 can encapsulate the packet header 202 with context information from the forwarding table 106. For example, the AP1 104 can augment the packet header 202 with a group_ID and with virtual network identifier information. Other context information can also be added to the packet header 202, such as SSID, client identifier, destination router IP address, and the IP address of the client device. The data packet 200 can also include an inner packet 204 that can include packet payload, source IP information, as well as other packet information.

Figure 1B:
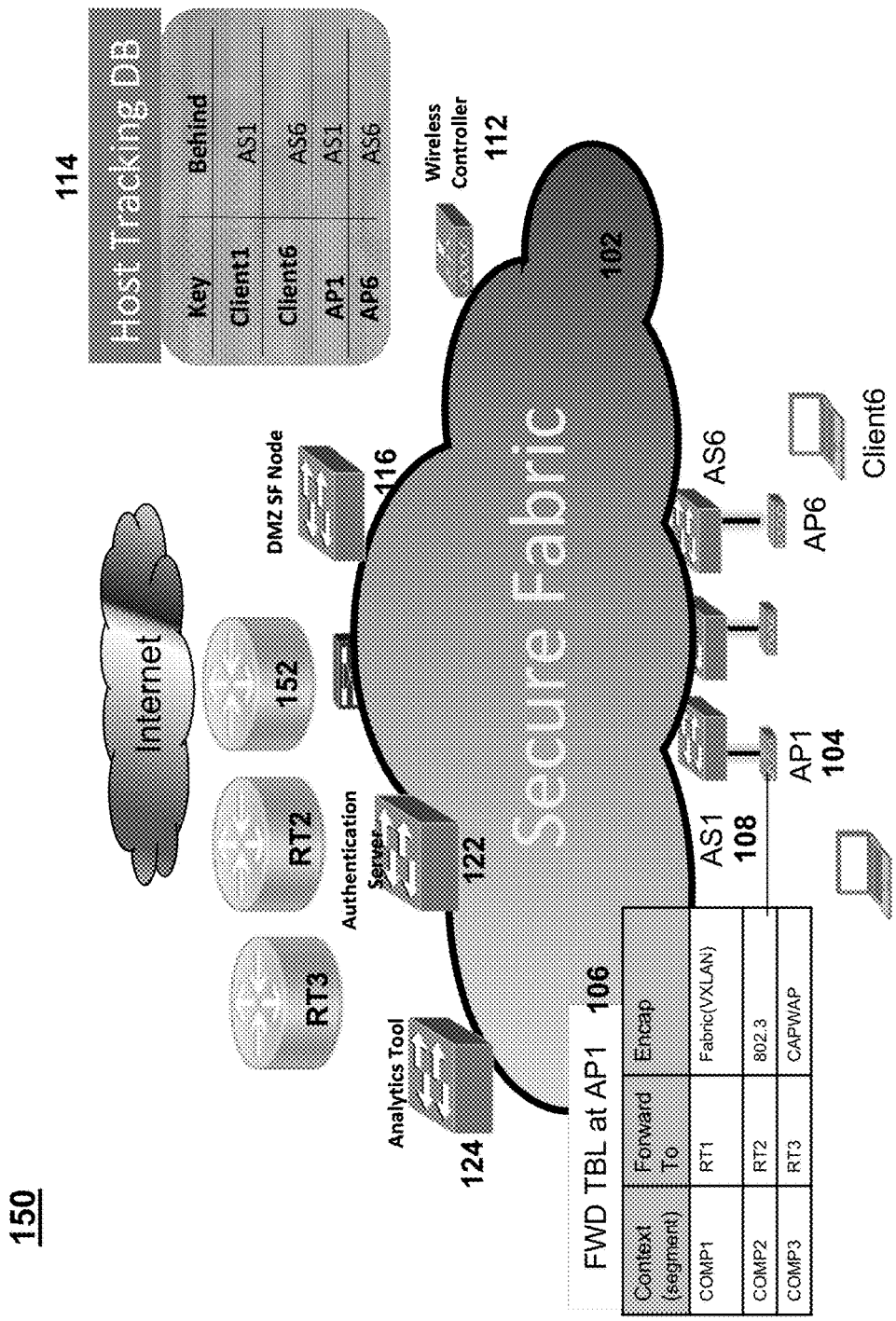
FIG. 1B is a schematic diagram of a network that includes an access point and an autonomous system in accordance with embodiments of the present disclosure.

FIG. 1B is a schematic diagram of a network system 150 that includes an access point and an autonomous system in accordance with embodiments of the present disclosure. The embodiment shown in FIG. 1B is similar to that shown in FIG. 1A, but illustrates how the AP can support multi-tenancy. The forwarding table 106 can include context information that includes an identifier of a tenant. In the example shown in FIG. 1B, three tenants are shown in the forwarding table 106: Company1, Company2, and Company3. Each context entry (i.e., company identifier) corresponds to a destination network location. In this example, company1 forwards to company1 router and is encapsulated for the fabric interconnect. When the client 130 of company1 attaches to the AP1 104, the AP1 104 can authenticate client 130 as being associated with company1 using an authentication server 122 and can receive information about company1 from the wireless controller 116. The AP1 104 can encapsulate incoming packets from client 130 with the context information, such as the company1 identifier, the forwarding information, and the encapsulation information. The AP1 104 can transmit the encapsulated packet to the AS1 108.

AS1 108 can decapsulate the packet header to identify the context information. The AS1 108 can route the packet according to the context information. For example, for a multitenant supported network, the AS1 108 can identify a tenant by a company name and can identify a destination for the packet from the packet header. The AS1 108 can also download the correct policy information for the company from the wireless controller 116. The AS1 108 can then apply the appropriate policies for the packet. The AS1 108 can also export the context information from the packet to an analytics tool 124. The AS1 108 can also route the packet to a company1_router 1 152.

Figure 3:
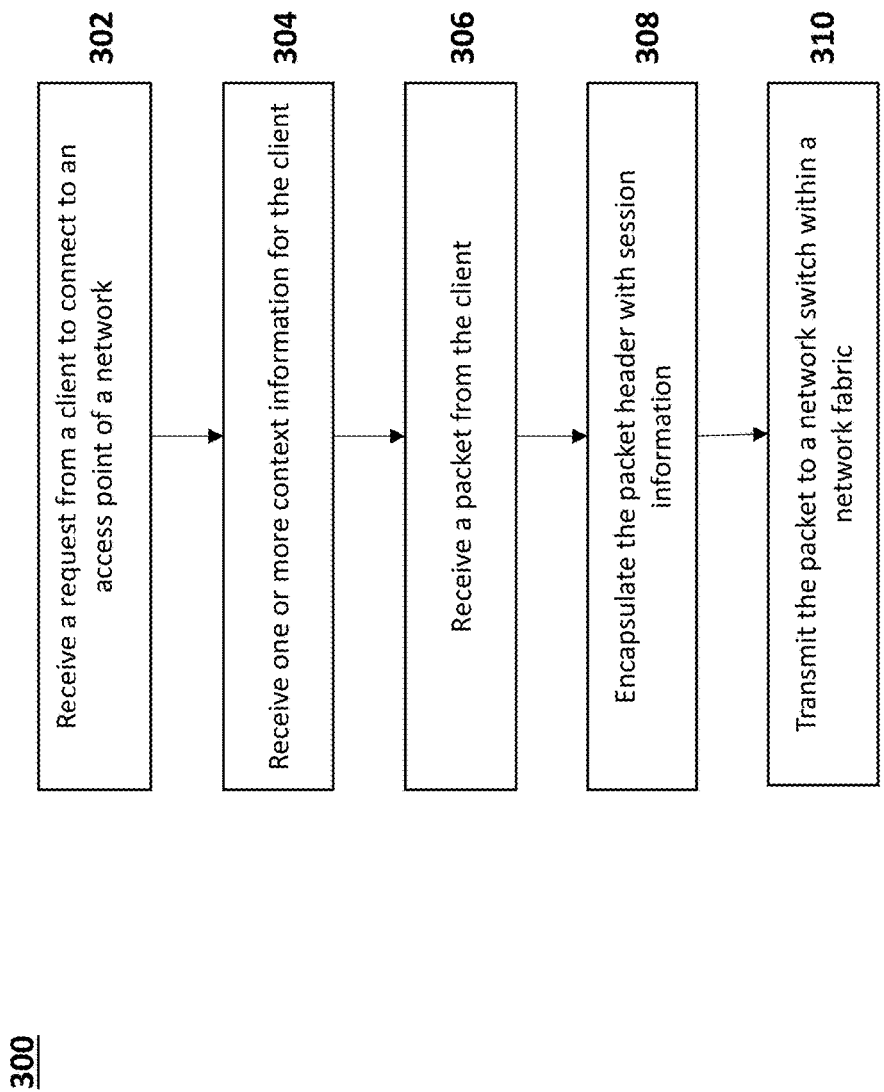
FIG. 3 is a schematic diagram of a network element for encapsulating a packet network service header, according to some embodiments of the disclosure.

FIG. 3 is a schematic diagram 300 of a network element for encapsulating a packet network service header, according to some embodiments of the disclosure. An access point can receive a request from a client to connect to a network (302). When the client attaches to the access point, the access point can request authentication of the client via an authentication server. The access point can also receive context information for the client from a wireless controller (304). The context information can be in the form of a forwarding table that can include context information, forwarding information, encapsulation information, etc. that are specific to the client. For multitenancy embodiments, the forwarding table can identify a tenant and corresponding routing information, as well as the encapsulation information (e.g., virtual network identifier, etc.).

The access point can receive a packet from the client (306). The access point can encapsulate a packet header (e.g., a NSH) with the context information from the forwarding table (308). The access point can then transmit the encapsulated packet to a first-hop switch or other autonomous system that is part of the network fabric (310).

Figure 4:
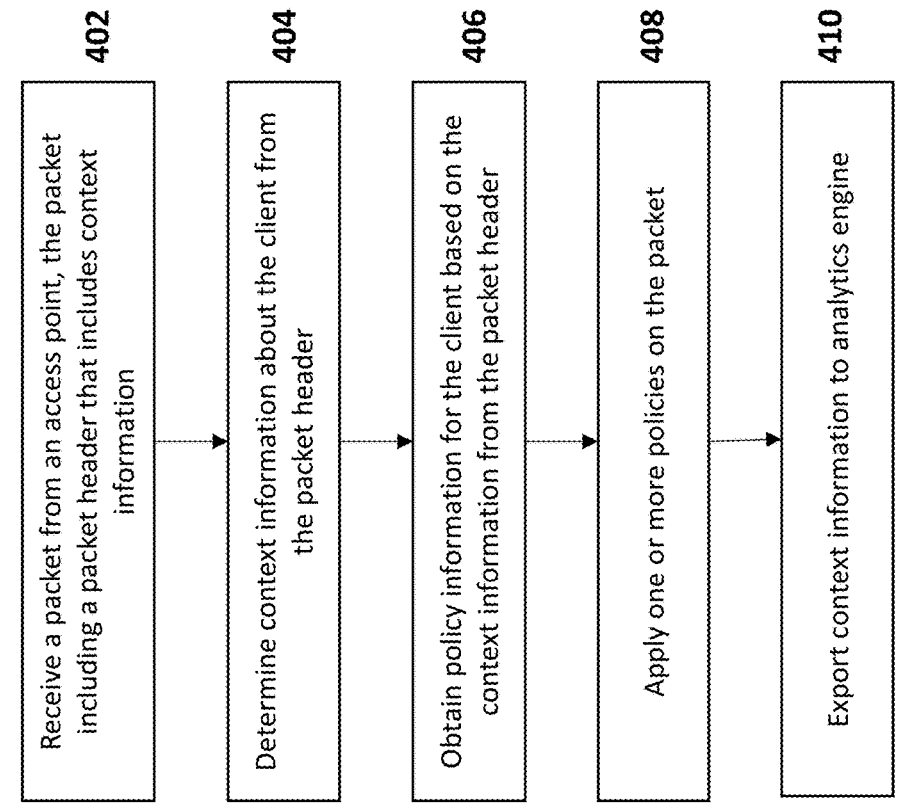
FIG. 4 is a process flow diagram of an access point encapsulating an incoming packet with context information in accordance with embodiments of the present disclosure.

FIG. 4 is a process flow diagram 400 of an access point encapsulating an incoming packet with context information in accordance with embodiments of the present disclosure. The autonomous system can receive a packet from an access point (402). The packet can include a packet header that includes context information about the client and/or the client's session with the access point. The autonomous system can decapsulate the packet header to extract the context information for the client (404). The AS can use the context information to obtain one or more policies for the client (406) and apply such policies to the packet (408). The AS can also export context information, along with other analytics information, to an analytics engine (410). The export of context information can be performed using, e.g., a Netflow export.

EXAMPLE EMBODIMENTS

VXLAN with EVPN

Control Plane Overlay networks in general, and Internet protocol ("IP") overlay networks in particular, are gaining popularity for providing virtual machine ("VM") mobility over Layer 3 ("L3") networks. Virtual eXtensible Local Area Network ("VXLAN") is a technique for providing a Layer 2 ("L2") overlay on an L3 network. In particular, VXLAN is used to address the need for overlay networks within virtualized data centers accommodating multiple tenants. In such overlay networks, native frames are encapsulated with an outer IP overlay encapsulation, as along with a VXLAN header, and UDP header. In VXLAN, each overlay is referred to as a VXLAN segment. VMs within the same VXLAN segment are within the same L2 domain. Each VXLAN segment is identified by a 24-bit segment identifier ("ID"), referred to as a VXLAN Network Identifier ("VNI"), which identifies virtual network segments for different tenants and allows up to 16M VXLAN segments to coexist within a single administrative domain. The term "VXLAN segment" herein may be used interchangeably with the term "VXLAN overlay network." Additional details are provided in "VXLAN: A Framework for Overlaying Virtualized Layer 2 Networks over Layer 3 Networks" (RFC 7348) (hereinafter "VXLAN RFC"), which is hereby incorporated by reference in its entirety.

A VXLAN tunnel endpoint ("VTEP") is a hardware or software component that performs VXLAN encapsulation and decapsulation. The IP address used by a VTEP as the source address for VXLAN encapsulation is referred to as the VTEP address. A leaf node, such as a Top of Rack (ToR) switch or router, may host one or more VTEPs, depending on its capability. Additional details are provided in RFC 7348, which is hereby incorporated by reference in its entirety.

Ethernet Virtual Private Network ("EVPN") is an L2 Virtual Private Network (L2VPN) solution over IP/MPLS networks. Originally designed for applications such as data center interconnect and business L2VPN services, EVPN is recently considered as a Network Virtualization Overlay (NVO) solution. EVPN BGP has been proposed to be used as a control protocol to distribute tenant system (TS) reachability and underlay tunnel endpoint information. In the proposal, a MAC/IP Advertisement Route is used to advertise reachability to the tenant systems, where the Next Hop field of the route is set to an underlay tunnel endpoint address such as VTEP address. In addition, it has been proposed to advertise the route with a new EVPN BGP extended community attribute called "Router's MAC Extended Community" carrying the router MAC of a router that hosts the underlay tunnel endpoint specified in the Next Hop field. The router MAC is then used as the inner destination MAC of a VXLAN encapsulated packet. Additional details are provided in L2VPN workgroup internet drafts "A Network Virtualization Overlay Solution using EVPN" (draft-ietf-bess-evpn-overlay-00, dated Nov. 10, 2014) and "Integrated Routing and Bridging in EVPN" (draft-ietf-bess-evpn-inter-subnet-forwarding-00, dated Nov. 11, 2014), each of which is hereby incorporated by reference in its entirety.

Dynamic Fabric Automation ("DFA"), also referred to as "Vinci," is one exemplary architecture for facilitating data center networking. The physical topology of DFA is based on a two-tier fat tree, also known as a Clos network, in which a plurality of leaf nodes (which may be implemented as Top of Rack ("ToR") switches or routers) connects to each of a plurality of spine nodes (implemented as switches or routers) and vice versa. To support data forwarding, IP fabric is used in one embodiment of DFA. While embodiments of the present disclosure are described with reference to DFA, as illustrated with the IP fabrics shown in FIGS. 1A and 1B, these embodiments are applicable to a broader scope of any VXLAN-based IP fabric, beyond DFA.

Multitenancy is an important feature for IP fabric. Tenant traffic is either switched or routed over the IP fabric, encapsulated with VXLAN segment IDs. A tenant may be allocated one or more Virtual Local Area Network ("VLAN") on a leaf node to which the virtual machines ("VMs") thereof are connected. Each VLAN is associated with a layer 2 ("L2") segment ID, which is used to encapsulate traffic switched over the fabric. In addition, a tenant may be associated with a VRF on the leaf node. The IP packets of a tenant may be forwarded over the IP fabric based on lookups in its VRF. Each VRF is associated with a layer 3 ("L3") segment ID, which is used to encapsulate traffic routed over the fabric.

Network Service Header (NSH) Encapsulation

Generally speaking, an NSH includes service path information, and NSH is added to a packet or frame. For instance, an NSH can include a data plane header added to packets or frames. Effectively, the NSH creates a service plane. The NSH includes information for service chaining, and in some cases, the NSH can include metadata added and/or consumed by service nodes or service functions. The packets and NSH are encapsulated in an outer header for transport. To implement a service path, a network element such as a service classifier (SCL) or some other suitable SFC-aware network element can process packets or frames of a traffic flow and performs NSH encapsulation according to a desired policy for the traffic flow.

Figure 5:
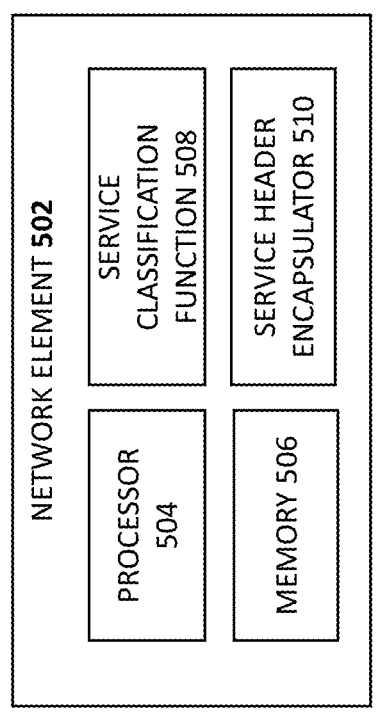
FIG. 5 is a process flow diagram of an autonomous system processing context information from a packet header in accordance with embodiments of the present disclosure.

FIG. 5 shows a system view of SFC-aware network element, e.g., such as a (initial) service classifier (SCL), for prescribing a service path of a traffic flow, according to some embodiments of the disclosure. Network element 502 includes processor 504, (computer-readable non-transitory) memory 506 for storing data and instructions. Furthermore, network element 502 includes service classification function 508 and service header encapsulator 510 (both can be provided by processor 504 when processor 504 executes the instructions stored in memory 506).

The service classification function 508 can process a packet of a traffic flow and determine whether the packet requires servicing and correspondingly which service path to follow to apply the appropriate service. The determination can be performed based on business policies and/or rules stored in memory 506. Once the determination of the service path is made, service header encapsulator 510 generates an appropriate NSH having identification information for the service path and adds the NSH to the packet. The service header encapsulator 510 provides an outer encapsulation to forward the packet to the start of the service path. Other SFC-aware network elements are thus able to process the NSH while other non-SFC-aware network elements would simply forward the encapsulated packets as is. Besides inserting an NSH, network element 502 can also remove the NSH if the service classification function 508 determines the packet does not require servicing.

Network Service Headers

A network service header (NSH) can include a (e.g., 64-bit) base header, and one or more context headers. Generally speaking, the base header provides information about the service header and service path identification (e.g., a service path identifier), and context headers can carry opaque metadata (such as the metadata described herein reflecting the result of classification). For instance, an NSH can include a 4-byte base header, a 4-byte service path header, and optional context headers. The base header can provide information about the service header and the payload protocol. The service path header can provide path identification and location within a path. The (variable length) context headers can carry opaque metadata and variable length encoded information. The one or more optional context headers make up a context header section in the NSH. For instance, the context header section can include one or more context header fields having pieces of information therein, describing the packet/frame. Based on the information in the base header, a service function of a service node can derive policy selection from the NSH. Context headers shared in the NSH can provide a range of service-relevant information such as traffic classification. Service functions can use NSH to select local service policy.

Variations and Implementations

Within the context of the disclosure, a network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

In one particular instance, the architecture of the present disclosure can be associated with a service provider deployment. In other examples, the architecture of the present disclosure would be equally applicable to other communication environments, such as an enterprise wide area network (WAN) deployment, The architecture of the present disclosure may include a configuration capable of transmission control protocol/internet protocol (TCP/IP) communications for the transmission and/or reception of packets in a network.

As used herein in this Specification, the term 'network element' is meant to encompass any of the aforementioned elements, as well as servers (physical or virtually implemented on physical hardware), machines (physical or virtually implemented on physical hardware), end user devices, routers, switches, cable boxes, gateways, bridges, load balancers, firewalls, inline service nodes, proxies, processors, modules, or any other suitable device, component, element, proprietary appliance, or object operable to exchange, receive, and transmit information in a network environment. These network elements may include any suitable hardware, software, components, modules, interfaces, or objects that facilitate the network service header features/operations thereof. This may be inclusive of appropriate algorithms and communication protocols that allow for the effective exchange of data or information.

In certain example implementations, the functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store databases or metadata disclosed herein. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

Any of these elements (e.g., the network elements, service nodes, etc.) can include memory elements for storing information to be used in achieving the features, as outlined herein. Additionally, each of these devices may include a processor that can execute software or an algorithm to perform the features as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations.

It is also important to note that the various steps described herein illustrate only some of the possible scenarios that may be executed by, or within, the nodes with capabilities described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by nodes with capabilities in that any suitable arrangements, chronologies, configurations, and timing mechanisms may be provided without departing from the teachings of the present disclosure.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. § 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method performed by an autonomous system of a network, the method comprising:
   receiving, from an access point, a data packet originating from a client, the data packet comprising a packet header augmented with context information, wherein the context information includes an identity of the access point that is used to determine a location of the client;
   decapsulating the packet header to identify the context information;
   applying a client-specific policy on the data packet based, at least in part, on the context information;
   identifying a next-hop destination for the data packet from the context information; and
   forwarding the data packet to the next-hop destination in the network.

2. The method of claim 1, wherein the context information comprises one or more of session information, group identification information, client identification information, encapsulation information, virtual network identification information, or service set identification information.

3. The method of claim 1, further comprising exporting the context information to an analytics tool network element.

4. The method of claim 3, wherein exporting the context information comprises exporting the context information as part of a Netflow export process.

5. The method of claim 1, further comprising:
   obtaining the client-specific policy from a controller network element based on the context information.

6. The method of claim 1, further comprising:
   obtaining next-hop information from a controller network element; and
   verifying the next-hop information based on the context information.

7. An autonomous system network element connected to a network, the autonomous system network element comprising:
   at least one memory element having instructions stored thereon;
   at least one processor coupled to the at least one memory element and configured to execute the instructions to cause the network element to:
   receive, from an access point, a data packet originating from a client, the data packet comprising a packet header augmented with context information, wherein the context information includes an identity of the access point that is used to determine a location of the client;
   decapsulate the packet header to identify the context information;
   apply a client-specific policy on the data packet based, at least in part, on the context information;
   identify a next-hop destination for the data packet from the context information; and
   forward the data packet to the next-hop destination in the network.

8. The autonomous system network element of claim 7, wherein the context information comprises one or more of session information, group identification information, client identification information, encapsulation information, virtual network identification information, or service set identification information.

9. The autonomous system network element of claim 7, wherein the at least one processor is configured to execute the instructions to cause the network element to export the context information to an analytics tool network element.

10. The autonomous system network element of claim 9, wherein the at least one processor is configured to export the context information as part of a Netflow export process.

11. The autonomous system network element of claim 7, wherein the at least one processor is configured to execute the instructions to cause the network element to:
  obtain the client-specific policy from a controller network element based on the context information.

12. The autonomous system network element of claim 7, wherein the at least one processor is configured to execute the instructions to cause the network element to:
  obtain next-hop information from a controller network element; and
  verify the next-hop information based on the context information.

13. A computer-readable non-transitory medium comprising one or more instructions for processing context information in a data packet, the instructions when executed on a processor are operable to:
  receive, from an access point, a data packet originating from a client, the data packet comprising a packet header augmented with context information, wherein the context information includes an identity of the access point that is used to determine a location of the client;
  decapsulate the packet header to identify the context information;
  apply a client-specific policy on the data packet based, at least in part, on the context information;
  identify a next-hop destination for the data packet from the context information; and
  forward the data packet to the next-hop destination in the network.

14. The computer-readable non-transitory medium of claim 13, wherein the context information comprises one or more of session information, group identification information, client identification information, encapsulation information, virtual network identification information, or service set identification information.

15. The computer-readable non-transitory medium of claim 13, wherein the instructions when executed on the processor are operable to cause the network element to export the context information to an analytics tool network element.

16. The computer-readable non-transitory medium of claim 15, wherein the instructions when executed on the processor are operable to cause the network element to export the context information as part of a Netflow export process.

17. The computer-readable non-transitory medium of claim 13, wherein the instructions when executed on the processor are operable to:
  obtain the client-specific policy from a controller network element based on the context information.

18. The computer-readable non-transitory medium of claim 13, wherein the instructions when executed on the processor are operable to:
  obtain next-hop information from a controller network element; and
  verify the next-hop information based on the context information.

19. The method of claim 1, further comprising:
  when the access point supports multitenancy, identifying a tenant based on the context information.

20. The autonomous system network element of claim 7, wherein the at least one processor is configured to execute the instructions to cause the network element to identify a tenant based on the context information when the access point supports multitenancy.

21. The computer-readable non-transitory medium of claim 13, wherein the instructions when executed on the processor are operable to:
  when the access point supports multitenancy, identify a tenant based on the context information.

* * * * *